United States Patent Office 2,751,740
Patented June 26, 1956

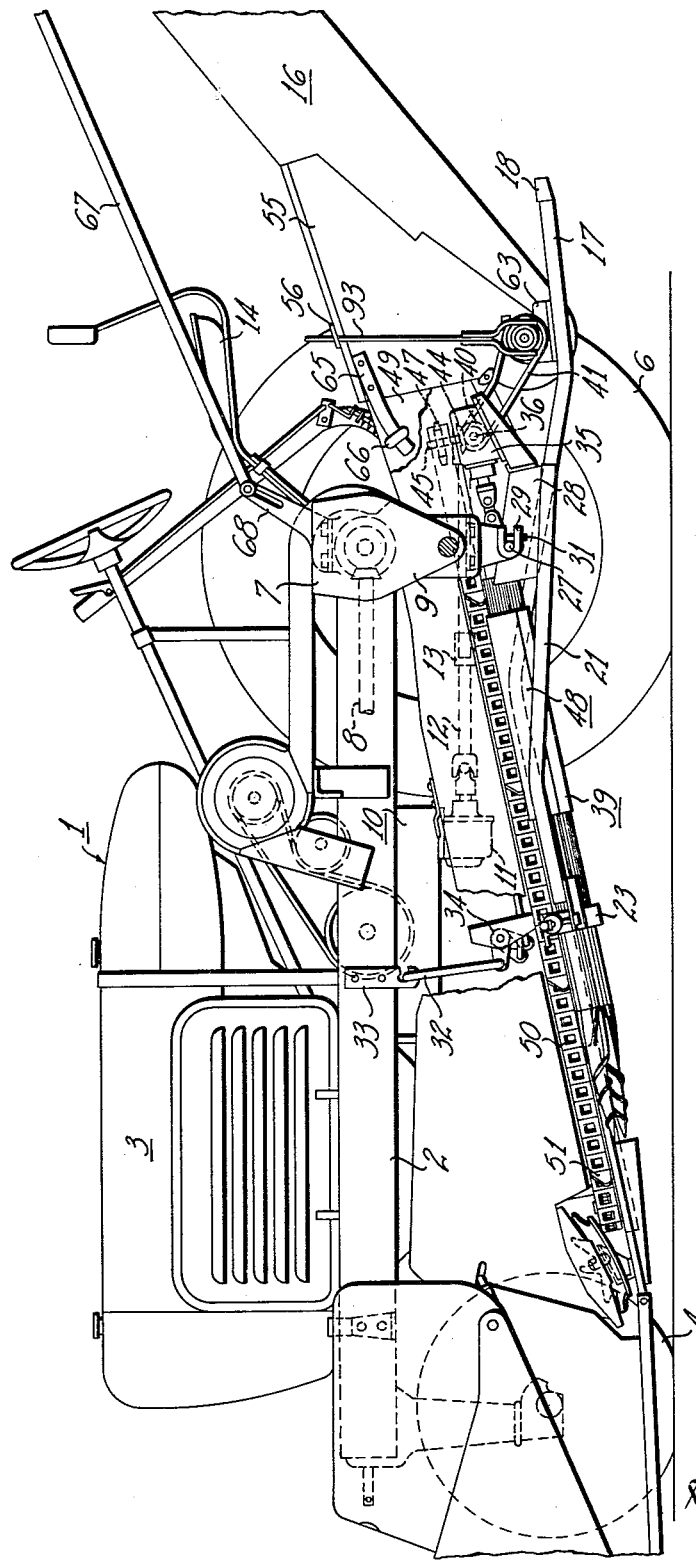

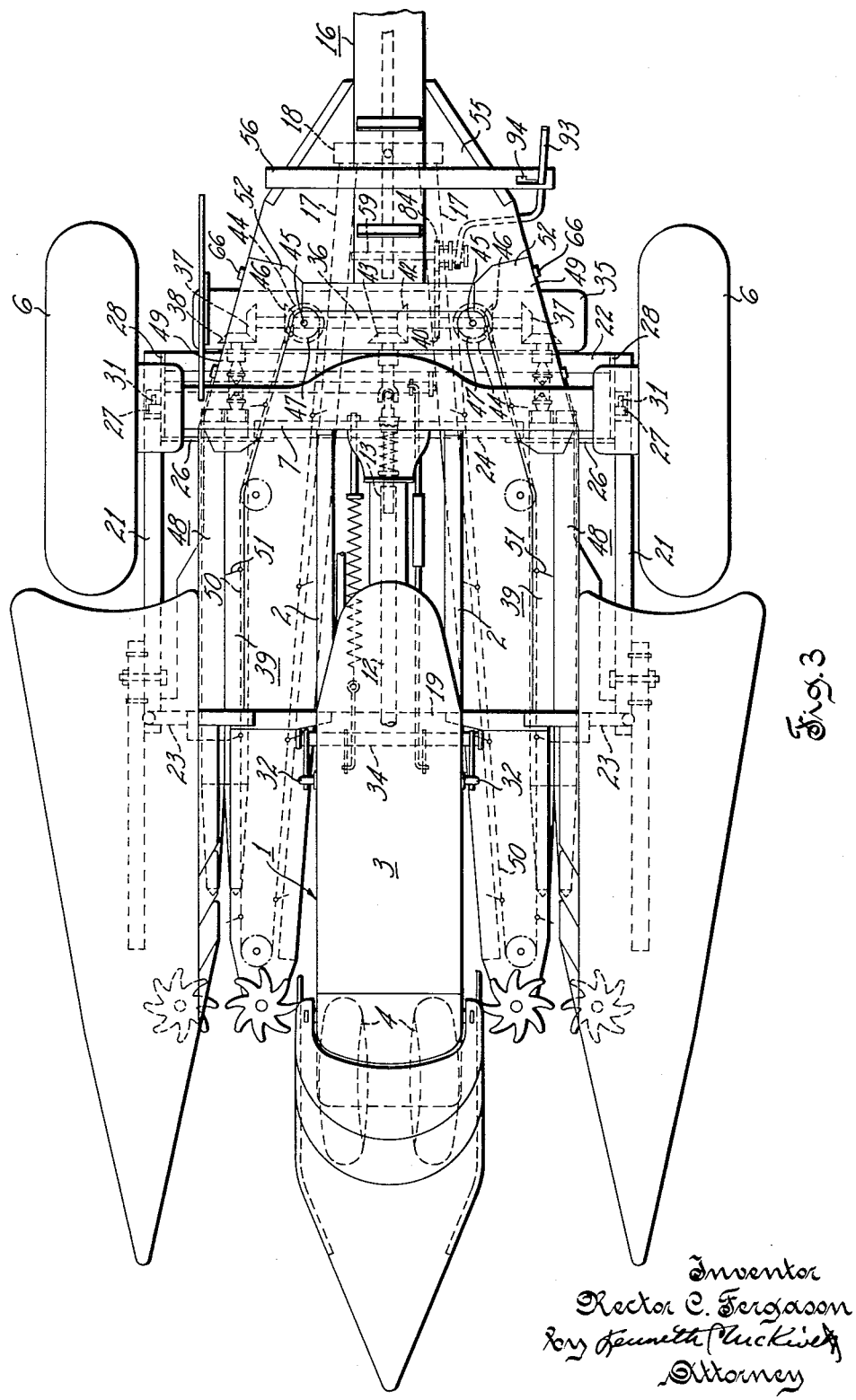

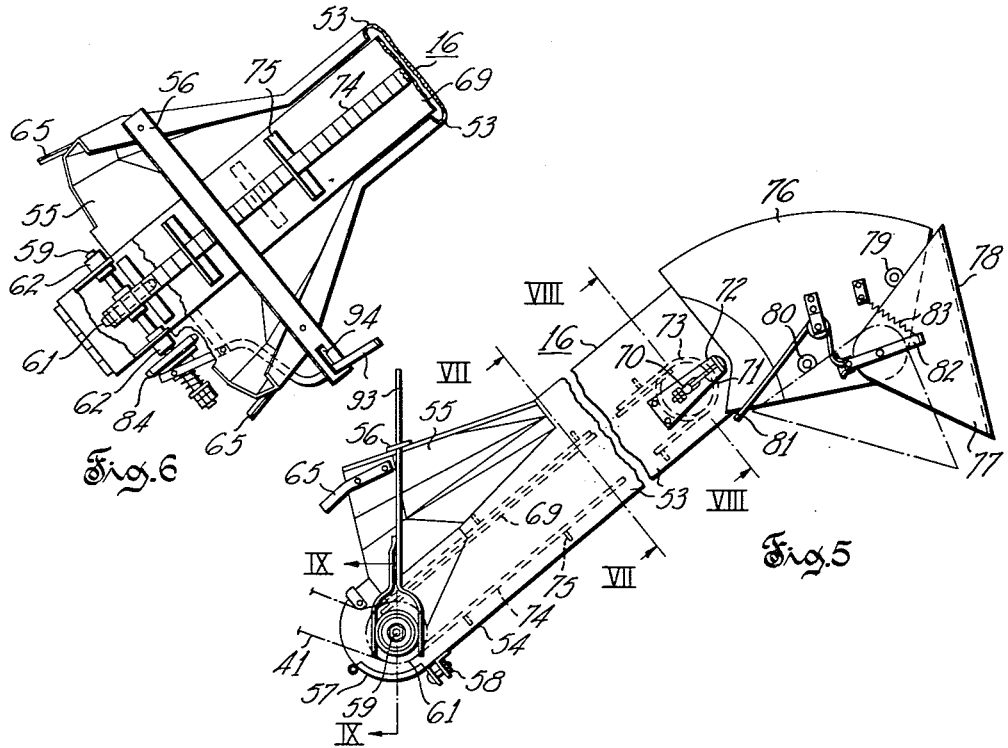
Fig. 6
Fig. 5
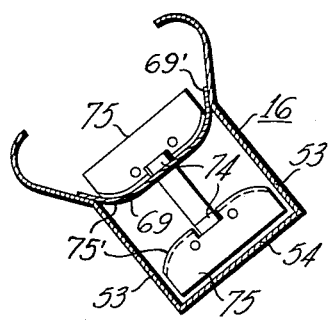
Fig. 7
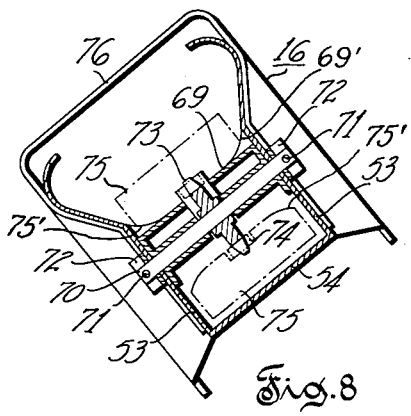
Fig. 8
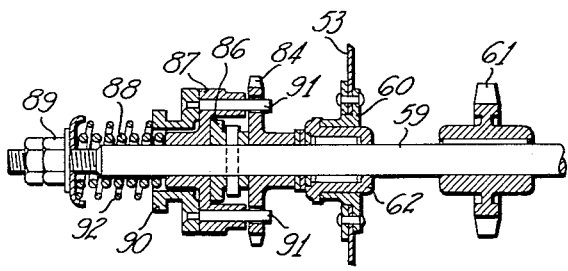
Fig. 9

2,751,740

ELEVATOR DRIVE MEANS FOR CORN HARVESTERS

Rector C. Fergason, Gadsden, Ala., assignor to Allis-Chalmers Manufacturing Company, Milwaukee, Wis.

Application August 18, 1949, Serial No. 111,057, now Patent No. 2,663,983, dated December 29, 1953, which is a continuation of application Serial No. 447,025, June 15, 1942. Divided and this application May 11, 1953, Serial No. 354,161

3 Claims. (Cl. 56—18)

This application is a division of my copending application Serial No. 447,025, filed June 15, 1942, now abandoned, and the continuation thereof, application Serial No. 111,057, filed August 18, 1949, now U. S. Patent 2,663,983, issued December 29, 1953, and the invention relates in general to agricultural implements, and has more particular relation to corn harvesters wherein during their travel through the field, ears of corn are picked from standing stalks and the husks are preferably removed from the picked ears and the latter are conveyed to a suitable point of collection.

The present invention is directed toward and contemplates avoiding or minimizing disadvantages of many present commercial forms of farm implements, and the production of a corn harvester of such simple design and construction, reduced number of parts and lightweight, as results in reduced initial cost to the farmer and reduced costs of operation, and embody features which provide for efficient operation and increased comfort and safety of the operator of the machine.

Advantages of this invention are concerned with the provision of an improved corn harvester for mounting on a tractor and wherein an elevating conveyer for harvested corn is mounted on, and preferably separately detachable from, the harvester frame, and additional advantages are concerned with the provision of a simple and improved combined slip and mechanically operated clutching device in the elevator drive.

Other objects of this invention are concerned with provision of a corn harvester of such improved design and construction as contribute to the attainment of the aforesaid and other structural and operating advantages, individually and collectively.

These and other objects and advantages are attained by the present invention, various novel features of which will be apparent from the description herein and the accompanying drawings, disclosing an embodiment of features of the invention, and will be more particularly pointed out in the annexed claims.

In the accompanying drawings:

Fig. 1 is a view in side elevation, with parts removed to facilitate illustration, showing a tractor mounted corn harvester embodying features of the present invention;

Fig. 2 is an enlarged side elevation of a detail shown in Fig. 1 with same removed to facilitate illustration;

Fig. 3 is a plan view of the harvester, with parts removed, in its relation to the tractor;

Fig. 5 is a broken side elevation of the elevator conveyer;

Fig. 6 is a plan view of the lower end of the conveyer shown in Fig. 5;

Figs. 7 and 8 are enlarged sectional views, in the planes of the lines VII—VII and VIII—VIII, respectively, of Fig. 5 with Fig. 7 having some parts removed for clarity of illustration; and Fig. 9 is an enlarged sectional view, in the plane of the line IX—IX of Fig. 5.

Figure 4:
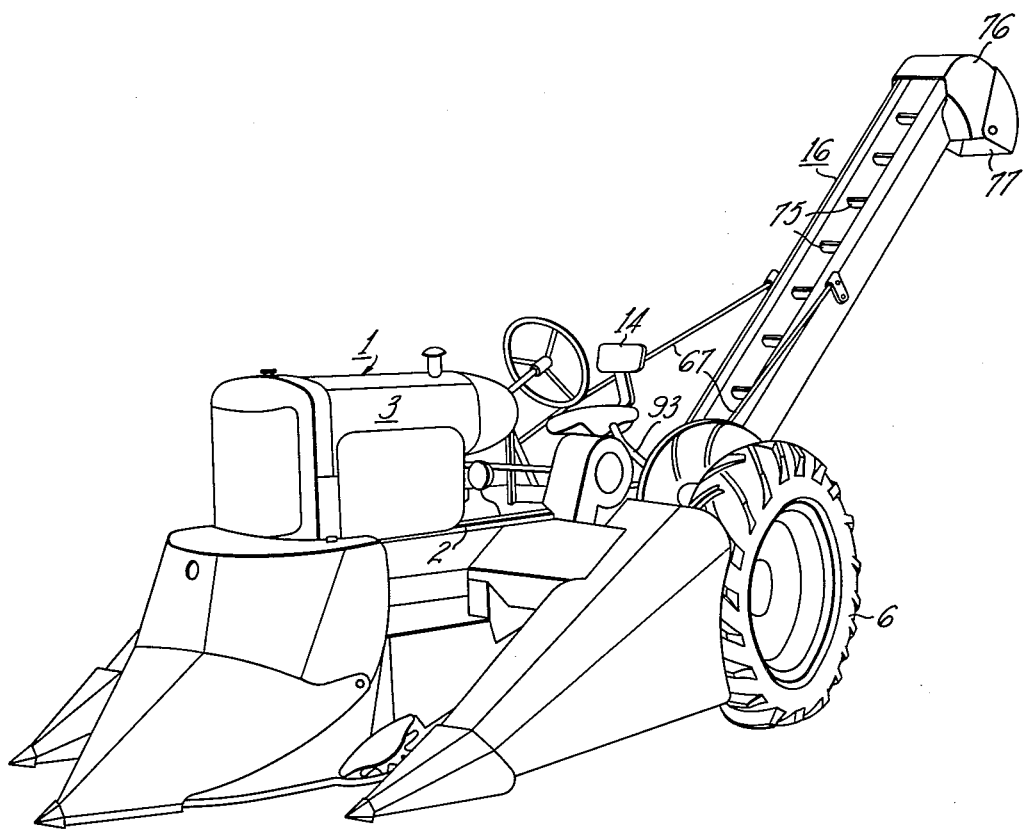
Fig. 4 is a perspective view of the harvester mounted on the tractor.

In the embodiment of the invention illustrated in the drawings, a conventional form of tractor 1, or other suitable form of mobile frame, includes a supporting frame 2 carrying an engine 3 with conventional control and other accessories. The tractor frame is supported on a pair of steerable front wheels 4 having their axles suitably hung from the frame, and on a pair of traction wheels 6 carried by a rear axle housing 7 supported on or integral with the rear portion of the tractor frame. This rear axle housing is preferably of the drop type wherein the central or intermediate portion encloses a differential drive, driven from the usual transmission shaft 8, and depending side portions 9 of the housing enclose gear connections from the differential to the axles of the traction wheels 6. A conventional change speed transmission 10 provides a variable speed connection from the engine shaft to the transmission shaft; and a power taffe-off connection 11, preferably associated with the transmission 10, serves to drive a power take-off shaft 12 having an internally splined sleeve 13 at its rear end for furnishing power to the various parts of an implement that may be associated with the tractor. An operator's seat 14 is suitably supported on the engine frame or rear axle housing in desired position with respect to the tractor controls.

The corn harvester is shown as comprising two units which are similar except as to being left and right, respectively, and each comprising cooperative picking and husking rolls mounted on a supporting frame and disposed at its own side of the tractor frame and with its essential harvesting parts disposed laterally within the tread of the adjacent traction wheels 6, and a conveying device extending rearwardly for conveying husked corn beneath the tractor rear axle housing and depositing it in the forward lower end of an elevating conveyer 16 at the rear of the tractor, along with suitable controls and drives for operating the several mechanisms of the harvester.

The harvester frame (see Fig. 3) comprises two longitudinally extending frame bars 17 inclined away from the center line of the harvester toward their forward end and having their rear portions downwardly inclined with respect to the forward portions. These bars 17 are connected in spaced relation through a cross bar 18 at their rear end, with their rear portion occupying a position substantially below the intermediate portion of the rear axle housing; and a cross bar 19 rigidly connected to the bars 17 at a forward point. Longitudinally extending frame bars 21 are disposed laterally outside of the bars 17 but at points within the tread of the adjacent traction wheels 6. The bars 21 are secured in desired assembled relation with respect to the bars 17 by a cross bar 22 connected through brackets to rear ends of the bars 21 and to the bars 17. The bars 21 are also connected to bars 17 by means of bearing supports 23. A cross bar 24 is also connected through brackets, to the longitudinal bars 17, and upstanding bracket member 26 serves to connect the lateral extensions of the cross bar 24 to the bars 21.

The harvester frame is pivotally mounted on the tractor through horizontally aligned pivot pins 27 carried by the frame, preferably mounted on bracket plates 28 (see Fig. 1) mounted on the rear portions of the frame bars 21, with the pivot element extending through and outward from the plate and welded thereto and braced thereon. The pins 27 are received in bearing recesses of bracket bearing members 29, which are open at their rear ends, the bearing pins being held in operative position in their bearing brackets 29 by removable locking pins 31. The bearing brackets are each attached to an underneath part of the depending side portions 9 of the rear axle housing 7. The laterally projecting pivot pins are in such position with respect to the other portions of the harvester frame that the tractor may be propelled rearwardly over the harvester frame and parts carried thereby when the frame is supported on the ground, with its rear end at a suitable elevation, until the rear ends of bearing brackets 29 pass over and receive the pivot pins therein.

The forward end of the harvester frame is hung from the tractor at an adjustable height above the ground through a pair of hanger rods 32 removably suspended from brackets 33 attached to each side of the tractor frame. The lower end of each of the hangers 32 is removably attached to a sleeve 34 adjustably carried by frame members 17.

An enclosing housing 35 (see Fig. 3) of a power transmitting device is removably mounted on a pair of brackets secured to cross bar 22. A cross shaft 36 is journaled and enclosed in housing 35 and has bevel gears 37 attached to the ends thereof. The gears 37 mesh with bevel gears 38 connected to the rear ends of longitudinally extending harvester rolls 39.

Shaft 36 has a sprocket wheel 40 attached to a mid-portion thereof and by means of chain 41 is adapted to be drivingly connected to ear elevating conveyer 16. A bevel gear 42 attached to shaft 36, meshes with a bevel gear 43 which through suitable power connections is operatively connected to the power take-off shaft of the tractor. A bevel gear 44 is secured to the lower end of each shaft 45 within housing 35 and in driven relation to bevel gears 46 attached to shaft 36. Attached to the upper end of shaft 45 indirectly through an overload clutch mechanism (not shown) is a sprocket 47.

With the parts of the power transmission drive in assembled relation, the shaft 36 is driven through bevel gears 42, 43. The shaft 36 acting through bevel gears 37, 38, drives the forwardly extending harvesting rolls 39, and the parts associated therewith and through bevel gear connection 44, 46 drives the sprockets 47 and the conveyers 50 associated therewith. Shaft 36 also drives conveyer 16 through chain connection 41 with sprocket 40.

Each picker husker unit comprises a pair of oppositely rotatable cooperative rolls, the outer roll being indicated generally at 48 and the inner rolls at 39. These rolls are rotatably supported in operative position through journal portions on the rolls at their ends in bearings carried by brackets 26 supported from frame members 17 and at an intermediate point in bearings mounted in bearing support 23 adjacent the forward end of longitudinal bars 21. The outer rolls 48 are drivenly connected to inner rolls 39 by means of mating spur gears mounted adjacent the rear ends thereof.

An endless conveyer 50 is supported on the harvester frame with the flights 51 of the active portion of the conveyer overlying rolls 39 and 48. This conveyer is operative to draw standing stalks between the harvesting rolls and to convey rearwardly over the rolls, ears of corn which have been snapped from the stalks.

Suitable shields are provided along the rolls and front end of the tractor and along the sides thereof which aid in guiding the stalks in between the harvesting rolls and maintaining the snapped ears in proper position so that they can be moved rearwardly by conveyer 50. A trough shield 49 is provided at the rear of each pair of harvesting rolls and which trough forms a floor over which husked ears of corn are moved by conveyer 50 to a lip portion 52 from whence the ears drop into a well portion 55 of ear elevator 16.

The elevating conveyer 16 comprises (see Figs. 5, 6 and 7) spaced substantially vertical side walls 53 each having an outwardly rolled and inturned flange at its upper edge and a bottom wall 54. At the lower end of the elevator, the upper portion of the side walls are flared outwardly to form the well portion 55 having generally vertical upper side wall portions connected by inclined wall portions to the lower vertical side wall portions of the housing. A bar 56 is preferably connected across the upper flanged portion of the side walls and serves to brace these wall portions of the well. The extreme lower rear end of the housing is preferably closed by a swingable door 57 (Fig. 5) pivotally mounted on adjacent portions of the lower vertical side walls. The free end of this door or closure 57 is detachably secured in position to the bottom of the well portion of the conveyer, as indicated at 58.

A shaft section 59 extends transversely across the lower end of the conveyer housing and passes through and is rotatably mounted and held against longitudinal movement in bearings whose housings are carried by tubular bushings or collars 60 secured to and projecting outwardly from the side wall sections 53. A chain sprocket 61 is fixed to the shaft 59 at a point intermediate the sides of the conveyer. The outer surface of the tubular bushings 60 have formed thereon or secured thereto pivot journals 62 to provide for pivotal movement of the conveyer as a whole. These journals 62 are carried and rotatable in bearing supports or brackets 63 (see Fig. 2) rotatably mounted on the longitudinal frame bars 17 adjacent the rear end thereof. The rear side of the bearing portions of the supports 63 are open to permit insertion of the pivot journals 62 into operative position, the journals being held against withdrawal from operative position by removable securing pins 64.

Forwardly projecting rods or bars 65 secured to the vertical side wall portions of the conveyer well 55 fit in and project through bails 66 on the outer side walls of the trough plates 49 and serve to position the conveyer 16 in operative position with respect to the harvester frame and the parts carried thereby, with the forward edge of the well 55 beneath discharge lip 52 of the trough plate 49 and the lip on the rear end of the guard overlying housing 35 (see Fig. 3). The conveyer 16 is held in normal elevated position by a pair of suspending or bracing rods 67 pivotally attached to an intermediate portion of the side walls of the conveyer housing, the forward end of these rods being adjustably and removably secured in position with respect to the tractor by bolts passing through the rods and through elongated slots in bracket 68 detachably secured to the engine frame or the rear axle housing at opposite ends thereof, the rods being so shaped and secured to the tractor at such points as to permit greatest freedom of movement of the operator without interference from these supporting rods. On removal of the attaching bolts from the brackets 68, the bracing rods may be swung rearwardly to a point where the ends thereof rest on the ground to support the upper end of the conveyer.

The body portion of the conveyer is provided with a transverse partition wall or plate 69 (see Figs. 7 and 8) extending throughout the length of the conveyer, the side portions of the plate being curved upwardly and secured to the upper flaring portion of the housing. This cross sectional shape of the partition plate 69 provides an active upper conveying surface on the partition having upwardly curving side edges.

At the upper end of the conveyer, a spindle or shaft 70 is secured in position against rotation in the side walls of the housing, while permitting controlled bodily movement of the shaft in the direction of the length of the conveyer for the purpose of tightening the chain. This effect may be secured through bolts 71 passing through a flange on brackets 72 secured to the outer face of the side walls of the conveyer, these bolts passing through the ends of the shaft and having draw nuts thereon for varying the separation of the shaft from such flanges. A chain sprocket 73 is freely rotatable on the intermediate portion of the shaft, being suitably constrained against appreciable movement longitudinally of the shaft.

A conveyer chain 74 passes over this sprocket and the sprocket 61 mounted within the lower end of the conveyer housing, the sprockets being so disposed relative to the partition wall 69 that the upper course of this chain travels along the upper surface 69' (Figs. 7 and 8) of the partition wall, the return course of the chain passing beneath the partition 69 to the lower chain sprocket 61. Conveyer flights 75 are secured to the conveyer chain, the flights standing generally perpendicular to the direction of travel of the chain, and the edge 75' of the flights traveling over the partition 69 being of substantially the same shape, with upwardly curving side portions, as the upper face 69' of the partition wall. Through this provision, any loose kernels of corn carried upwardly by the conveyer will always roll downwardly along the curved side edges of the plate 69 to a central position where they lie in the direct path of the conveyer flights and will thus be positively conveyed upwardly by the latter without any danger of the kernels passing downward past or lodging between the edges of the flights and the adjacent side wall.

The space between the upper end of the partition wall 69 and the lower wall of the conveyer is suitably closed to prevent the return passage of material downwardly therethrough. A deflecting hood 76 fits about and is attached in position on the upper end of the conveyer housing in position to receive all the material passing over the rear edge of the partition 69 and conduct the material to the lower and rear open discharge edges of the hood.

A spout 77 having a transverse wall 78 and opposed side walls of generally triangular shape fits over the rear end of the hood 76 and is pivotally mounted thereon through pivot bolts carried by the side walls of the hood and the side walls of the spout. In the position shown in full lines, wherein an edge of the side wall of the spout is held against a stop 79 on the hood (see Fig. 5), most of the material discharging from the hood will strike the transverse wall 78 of the spout and be deflected downward with a forward component, so that, with a trailing wagon attached, the discharge of material may be directed from the spout toward the forward portion of the wagon. With the spout 77 adjusted to its dotted line position, wherein another edge of the side wall of the spout engages a stop 80 on the hood, the material discharging from the hood will flow rearwardly over the transverse wall of the spout and be discharged downwardly with a rearward component, thus insuring that the material will be deposited in the rear portion of the trailing wagon. Through this adjustable mounting of the discharge spout, material may be deposited on the trailing wagon in such a manner as to fully and evenly load the latter. The trailing wagon (not shown) is preferably attached through a draft connection to the rear cross bar 18 of the harvester frame.

The adjustment of the discharge spout to each of its two positions is accomplished by a single pull on an operating cord 81 whose forward end is carried to a point within convenient reach of the tractor operator, and whose rear end is secured to one end of bracket 82 fixed to the sidewall of the spout. A spring 83 is connected at one end to a bracket mounted on the side wall of the hood and at its other end to the bracket 82 at a point which is diametrically opposite, with respect to the pivot of the spout, to the point of attachment of the cord 81 to this bracket. With the spout in the position shown in full lines, a sharp pull on the cord 81 will serve to rotate the discharge spout clockwise about its pivot until the point of attachment of the spring to the bracket 82 moves downwardly past the pivotal connection of the spout to the hood, the spring being under increasingly greater tension during this movement. As the spring passes the pivotal point of the hood, the spring is immediately effective of itself, or supplemented by the weight of momentum of the moving hood, to quickly complete the movement of the spout about its pivot to the dotted line position wherein the edge of the side wall of the spout engages the stop 80 on the hood. When the spout is to be moved from the dotted line position to the full line position, a similar sharp pull on the cord is effective to rotate the spout in a counterclockwise direction until the spring becomes effective to complete the movement of the spout to the full line position wherein the edge of the spout engages the stop 79 on the hood.

Outwardly beyond the adjacent pivot journal 62 of the conveyer 16, a sprocket 84 is rotatably mounted on the shaft 59 (see Fig. 9), and is spaced from the adjacent end of the housing of the shaft bearing by a bearing washer. The driving chain 41 passes over this sprocket and the sprocket 40 on the drive shaft 36 of the power drive. This drive chain is of a type which can readily be opened at least at one point for facility in assembling the chain on and removing it from the sprockets.

A clutch element 86 is secured to the shaft 59, as by a pin driven through the connected elements, outside the sprocket 84. The outer face of the clutch element 86 is provided with a suitable form of frictional clutching surface, either plain frictional or ratchet type, and the adjacent surface of a clutch element 87 is such as to frictionally engage the clutching surface of the element 86, the element 87 being urged into clutching relation with the element 86 by a spring 88 engaging the end of a tubular portion of the clutch element 87 and held in compression to the desired extent by a washer and adjustable nut 89 on the outer end of the shaft. An annular element 90 is mounted, through a sleeve portion thereof, on a tubular outer extension of the clutch element 87 and is provided with a radial flange at its outer end. Axially extending pairs of pins 91 secured in the element 90 project through spaced apertures in the sprocket 84 and, with the parts in this condition, form a normal driving connection between the element 87 and the sprocket 84. A compression spring 92, preferably lighter than the spring 88, surrounds the latter spring and bears at its inner end against the flange on the element 90 and is held in compression by the nut 89. The normal driving connection between the sprocket 84 and the shaft 59 may be broken at will through a clutch lever 93 pivoted on a bracket attached to the conveyer housing and having an operating connection with the element 90. On suitable actuation of the lever 93 the element 90 is drawn outwardly, against the action of the spring 92, until the driving pins 91 are fully withdrawn from the apertures in the sprocket 84, at which time the latter is free to rotate on the shaft. The lever 93 is suitably held in driving and nondriving positions by fitting into enlarged portions of a recess 94 of the bracing bar 56.

Operation of the clutch lever 93 has no effect toward disturbing the normal driving relation between the clutch elements 87 and 86 which are independently held in clutched relation by the inner spring 88. However, assuming that pins 91 are engaged with sprocket 84 providing a driving connection therebetween, if the load on the driving shaft 59 should at any time exceed a predetermined amount dependent upon the stress on the spring 88, the latter will yield and permit rotation of the clutch element 87 on the shaft independently of the clutch element 86, thus interrupting the drive from the sprocket 84 to shaft 59 until the load on the shaft returns to normal.

When it is desired to remove the harvester from the tractor, with the tractor stopped and preferably with the clutch on the tractor power take-off released, the rear elevator suspension rods 67 may be consecutively removed from their attachment to the tractor and swung down and back so that their ends rest on the ground and carry the weight of the upper portion of the conveyor; the rear elevator chain 41 may be disconnected from the elevator driving sprocket 84, and the pins 64 may be removed from the brackets 63, whereupon the receiving well portion of the ear elevating conveyer 16 is moved rearwardly until the pivot journals 62 are out of engagement with brackets 63 and the receiving well portion may be lowered to the ground or suitable blocks (not shown). If desired the rods 67 can be pivoted to ground engaging relation as the last step in the operation of removing the ear elevating conveyer in place of the previously described first step. The steps in reengaging the ear elevating conveyer will not be here repeated as they are just the opposite of the previously mentioned steps.

If desired, the support afforded by the rods 67 resting on the ground may be dispensed with and the conveyer housing may be swung on its pivots 62 so as to be on the ground.

It is not necessary, in removing the harvester from the tractor, to remove the rear elevator, it being only necessary to detach rods 67 from engagement with the tractor. The rear elevator can then be removed from the tractor as a part of the unitary harvesting structure. The further details of such removal from the tractor are more fully described in the previously mentioned application Serial No. 111,057 of which this present application is a division and reference may be had to such application if further details are required.

The harvester component of the herein disclosed tractor harvester combination constitutes a corn harvester attachment for tractors and, in general terms, comprises a frame which is adapted for mounting on a tractor in longitudinally extending relation to the latter; such frame, in the illustrated embodiment of the invention, including the longitudinal frame bars 17 and the transverse frame bars 18, 19 and 24. A main drive shaft, as represented by the cross shaft 36, is mounted on said frame for rotation on a transversely extending axis, and harvester rolls and associated conveying means, as represented by the harvester rolls 39, 48 and by the endless conveyors 50, are operatively mounted on the attachment frame and connected in driven relation with the main drive shaft 36. An elevator drive shaft, as represented by the shaft section 59, is mounted on the attachment frame for rotation on a transverse axis rearwardly of the main drive shaft 36. An elevator housing, which in the illustrated embodiment of the invention includes side walls 53 and the bottom wall 54, is pivotally supported on the attachment frame coaxially with the elevator drive shaft 59 and has a receiving well, such as the well 55, in material receiving relation to the delivery end of the forward conveying means 50. Means for advancing material from the receiving well longitudinally of the elevator housing include an endless conveying element, as represented by the chain 74 and associated flights 75, which is trained about and driven by the elevator drive shaft 59. Power transmitting means which operatively connect the main drive shaft 36 in driving relation with the elevator drive shaft 59 comprise an overload release clutch and a control clutch as best shown in Fig. 9; the overload release clutch having relatively rotatable driving and driven clutch elements, as represented by the clutch elements 86 and 87, which are mounted on the elevator drive shaft 59. The control clutch has an axially fixed driving element, such as the combined sprocket and clutch element 84, which is mounted on the elevator drive shaft 59 for rotation relative thereto, and an axially loose driven element, as represented by the annular element 90 and associated pins 91, which is connected in torque transmitting relation with the driving element 87 of the overload release clutch for shifting movement into and out of cooperative engagement with the axially fixed driving element 84 of the control clutch. A power transmitting element, as represented by the sprocket wheel 40 (Fig. 1), is secured to the main drive shaft 36 and connected in driven relation with the axially fixed driving element 84 of the control clutch.

It is not desired to limit this invention to the particular details of construction and design shown as the invention hereinafter claimed may be utilized with different types of harvesters and includes such other applications and modifications as are fairly included within the scope of the annexed claims.

It is claimed and desired to secure by Letters Patent:

1. A corn harvester attachment for tractors comprising, in combination, a frame adapted for mounting on a tractor in longitudinally extending relation thereto, a main drive shaft mounted on said frame for rotation on a transversely extending axis, harvester rolls and associated conveying means operatively mounted on said frame and connected in driven relation with said main drive shaft, said conveying means having a delivery end rearwardly of said harvester rolls; an elevator drive shaft mounted on said frame for rotation on a transverse axis rearwardly of said main drive shaft; an elevator housing pivotally supported on said frame coaxially with said elevator drive shaft and having a receiving well in material receiving relation to said delivery end of said conveying means; means within said elevator housing including an endless conveying element trained about and driven by said drive shaft for advancing material from said receiving well longitudinally of said elevator housing; and power transmitting means operatively connecting said main drive shaft in driving relation with said elevator drive shaft, said power transmitting means comprising an overload release clutch having relatively rotatable driving and driven clutch elements mounted on said elevator drive shaft, a control clutch having an axially fixed driving element mounted on said elevator drive shaft for rotation relative thereto and an axially loose driven element connected in torque transmitting relation with said driving element of said overload release clutch for shifting movement into and out of cooperative engagement with said axially fixed driving element of said control clutch, and a power transmitting element secured to said main drive shaft and connected in driving relation with said axially fixed driving element of said control clutch.

2. A corn harvester attachment as set forth in claim 1, wherein said overload release clutch comprises a driven clutch element secured in nonrotatable axially fixed relation to said elevator drive shaft, a complementary driving clutch element mounted on said elevator drive shaft in rotatable axially shiftable relation thereto, a spring abutment secured to said elevator drive shaft, and spring means operatively interposed between said spring abutment and said complementary driving clutch element for urging the latter in cooperative engagement with said driven element secured to said elevator drive shaft.

3. A corn harvester attachment as set forth in claim 2 and further comprising spring means operatively interposed between said spring abutment and said driven element of said control clutch so as to bias said driven clutch element of said control clutch toward said axially fixed driving element of said control clutch.

References Cited in the file of this patent

UNITED STATES PATENTS

| | | |
|---|---|---|
| Re. 22,279 | Hyman et al. | Mar. 2, 1943 |
| 450,192 | Reynolds | Apr. 14, 1891 |
| 1,008,942 | Boda | Nov. 14, 1911 |
| 1,646,741 | Barnett | Oct. 25, 1927 |
| 1,847,433 | Krause | Mar. 1, 1932 |
| 1,854,561 | Owens et al. | Apr. 19, 1932 |
| 1,967,498 | Coultas et al. | July 24, 1934 |
| 2,004,720 | Coultas et al. | June 11, 1935 |
| 2,016,994 | Fleming | Oct. 8, 1935 |
| 2,160,486 | Oehler et al. | May 30, 1939 |
| 2,399,740 | Hyman | May 7, 1946 |